(12) United States Patent
Ruster et al.

(10) Patent No.: US 8,781,294 B2
(45) Date of Patent: Jul. 15, 2014

(54) MEDIA CONTENT CACHING

(71) Applicant: Seagate Technology LLC, Cupertino, CA (US)

(72) Inventors: Jean-Pierre Ruster, Sunnyvale, CA (US); Chandra Shaker Buddhavaram, Fremont, CA (US); Faheem Ahmad Dani, San Jose, CA (US); Wayne Gu Huang, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/691,368

(22) Filed: Nov. 30, 2012

(65) Prior Publication Data

US 2014/0153898 A1 Jun. 5, 2014

(51) Int. Cl.
*H04N 5/76* (2006.01)
*H04N 5/92* (2006.01)

(52) U.S. Cl.
USPC .......................................... 386/231; 386/248

(58) Field of Classification Search
USPC .................. 386/231, 200, 213, 216, 224, 248
See application file for complete search history.

(56) References Cited

U.S. PATENT DOCUMENTS

| 2005/0076374 | A1 | 4/2005 | Nakamura | |
| 2008/9150697 | | 6/2009 | Yang | |
| 2012/0137156 | A1* | 5/2012 | Huang et al. | 713/324 |
| 2013/0205157 | A1* | 8/2013 | Fujisawa | 713/324 |

FOREIGN PATENT DOCUMENTS

| EP | 1696305 A1 | 8/2006 |
| WO | 2004023279 A2 | 3/2004 |

OTHER PUBLICATIONS

Khadilker, M et al, "Usage-based DHCP Lease Time Optimization", IMC '07 Proceedings of the 7th ACM SIGCOMM conference on Internet measurement, Oct. 24, 2007, pp. 71-76.

* cited by examiner

*Primary Examiner* — Robert Chevalier

(57) ABSTRACT

A playback device includes tangible storage configured to receive transfer of media content from a remote communications device to the playback device while the remote communications device is operating in a high power mode. Interface logic is coupled to the tangible storage and configured to signal the remote communications device during the transfer to prepare the remote communications device to enter a low power mode after the transfer is complete. The remote communications device includes a content manager configured to transfer of media content from the remote communications device to a playback device while the remote communications device is operating in a high power mode. Power logic is coupled to the content manager and configured to prepare the remote communications device to enter a low power mode after the transfer is complete, responsive to receipt of a signal from the playback device during the transfer is complete.

20 Claims, 11 Drawing Sheets

MEDIA CONTENT CACHING

CROSS-REFERENCE TO RELATED APPLICATIONS

The present application is related to U.S. patent application Ser. No. 13/691,410, entitled "Managing Gateway Access" and filed concurrently herewith, which is specifically incorporated by reference herein for all that it discloses and teaches.

BACKGROUND

When a user plays a movie or other content on a mobile device, such as a tablet or a smart phone, he or she can wirelessly stream the movie from a storage device, such as a remote battery-powered storage device. However, having a storage device stream a movie or other content to a mobile device can unnecessarily use extra power.

SUMMARY

Implementations described and claimed herein manage power of a remote communications device in the context of loading streamable media content to a client device (e.g., a device executing a media player).

A playback device includes tangible storage configured to receive transfer of media content from a remote communications device (e.g., a personal WiFi device, a remote storage device providing gateway access to another network, etc.) to the playback device while the remote communications device is operating in a high power mode. Interface logic is coupled to the tangible storage and configured to signal the remote communications device during the transfer to prepare the remote communications device to enter a low power mode after the transfer is complete.

A remote communications device includes a content manager configured to transfer of media content from the remote communications device to a playback device while the remote communications device is operating in a high power mode. Power logic is coupled to the content manager and configured to prepare the communications storage device to enter a low power mode after the transfer is complete, responsive to receipt of a signal from the playback device during the transfer.

Other implementations are also described and recited herein.

BRIEF DESCRIPTIONS OF THE DRAWINGS

DETAILED DESCRIPTIONS

Figure 1:
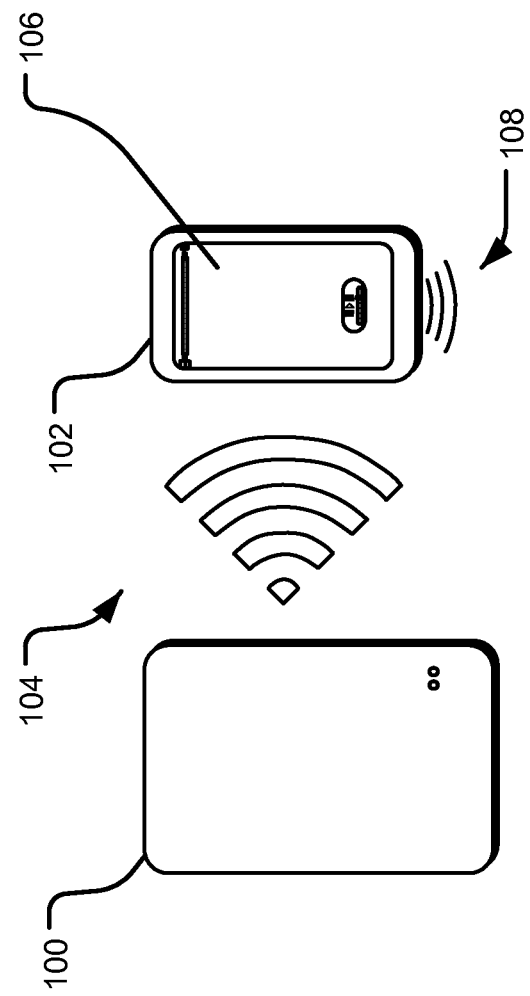
FIG. 1 illustrates an example remote storage device communicating with a client device.

FIG. 1 illustrates an example remote storage device 100 communicating with a client device 102. In the illustrated implementation, the remote storage device 100 is a battery-powered external hard-drive with wireless communications capabilities with one or more other devices through a wireless channel 104. It should be understood that neither battery-power nor wireless communications are required in certain applications of the described technology. The illustrated client device 102 is represented as a mobile phone, although other computing devices, including without limitation tablet computers, mobile computers, and desktop computers may be employed within the described technology.

The client device 102 can play a movie or audio content (examples of a streamable media content resource) through its display 106 or through other output interfaces, such as speakers or tactile outputs. See for example the sound signals represented by waves 108. The movie has been transferred from the remote storage device 100 and wirelessly loaded onto the client device 102. If the client device 102 streams the movie from the remote storage device 100, the remote storage device 100 would typically be operating in a standard power mode (e.g., with the disc spinning or flash media active, data being read, data being received and transmitted, etc.) for most of the length of the movie. In an example of a two-hour movie, the remote storage device 100 is operated in a standard power mode for about two hours as the media content is concurrently loaded from and displayed on the client device 102 (e.g., with a small amount of buffering, where the buffering can be employed to reduce or eliminate jitter during playback on the client device 102). Other examples of media content may include without limitation audio content, slide shows, documents, video games, and other streamable data content that may be presented (e.g., played) to a user while loading onto the user's device.

In an alternative mode, however, the client device 102 receives media content data from the remote storage device 100 at a faster rate than that employed in a typical buffered streaming mode. Rather than loading data at a relatively minimum rate sufficient for playback (potentially with a smaller amount of buffering), the client device 102 starts to concurrently load and playback the media content, but the client device 102 also loads the entire media content resource at a relatively faster rate into local storage of the client device 102 (e.g., to a hard drive, to solid state memory, to flash media, to RAM (random access memory), etc.). After the loading has completed, the remote storage device 100 can enter a low power mode to conserve energy. When a new movie is selected for playback, the client device 102 can restore communications with the remote storage device 100, which can resume standard power mode and begins transfer of the new movie content to the client device 102.

It should be understood that, in other implementations, while the transfer of an entire or substantially entire media content resource may trigger the entry into low power mode, other segments of the resource may be configured to trigger entry into low power mode. For example, the remote storage device 100 may quickly transfer a smaller portion of the resource, such an hour of a two hour movie (or some similar segment thereof, such as may be limited by available storage capacity on the client device 102 or user settings), enter a lower power mode of a period of time, and then resume its transfer in a standard power mode thereafter.

In one implementation, the client device 102 initiates the transfer of the media content with a Transfer API (application programming interface) call to the IP (internet protocol) address of the remote storage device 100, which causes the remote storage device 100 to initiate the transfer of the media content resource. While receiving the media content, the client device 102 can begin playback of the media content resource (e.g., in a streaming playback mode). However, the Transfer API call also causes the remote storage device 100 to enter a new state in which the remote storage device 102 disables its gateway. In one implementation, the remote storage device 102 disables its gateway by deleting addresses in the DHCP gateway address setting and the DNS (domain name server) address setting. A gateway refers to a router in a TCP/IP (transmission control protocol/internet protocol) network that serves as an access point to another network. When the client device 102 attempts to renew its DHCP lease with the remote storage device 100, the gateway is disabled and so the client device 100 terminates attempts to re-connect with the remote storage device 100 for other purposes. Accordingly, the remote storage device 102 maintains its communication connection with the client device 102 via the remote storage device's IP address to continue transferring the media content resource but terminates the client device's ability to access the client device 102 as an access point (e.g., terminating gateway accesses to the remote storage device 100 by the client device 102). Accordingly, after the media content resource is transferred to the client device 102 (and assuming no other client devices are accessing the remote storage device 100), the remote storage device 100 detects a period of communication inactivity and enters a low power mode. Meanwhile, the client device 102 can continue playback of the media content from its local storage without interaction with the remote storage device 100.

After playback of the media content resources is terminated at the client device 102, the client device 102 "wakes up" the remote storage device 100 by issuing a Wake API call to the IP address of the remote storage device 100, which directs the remote storage device 100 to restore its gateway. "Waking up" the remote storage device 100 involves transitioning the remote storage device 100 into a higher power mode and/or an enabling of additional or different functionality in the remote storage device 100. In one implementation, restoration of the gateway in the remote storage device 100 involves restoring valid addresses to the DHCP gateway address setting and the DNS address setting. In this state, the remote storage device 100 can establish access point connections with the client device 100 and other devices.

After a successful restoration of the gateway in the remote storage device 100, the client device 102 can issue a Restore API call to reset the communications connection with the remote storage device 100. In one implementation, resetting the communications connection involves the client device 102 renewing its DHCP lease with the gateway in the remote storage device 100.

Figure 2:
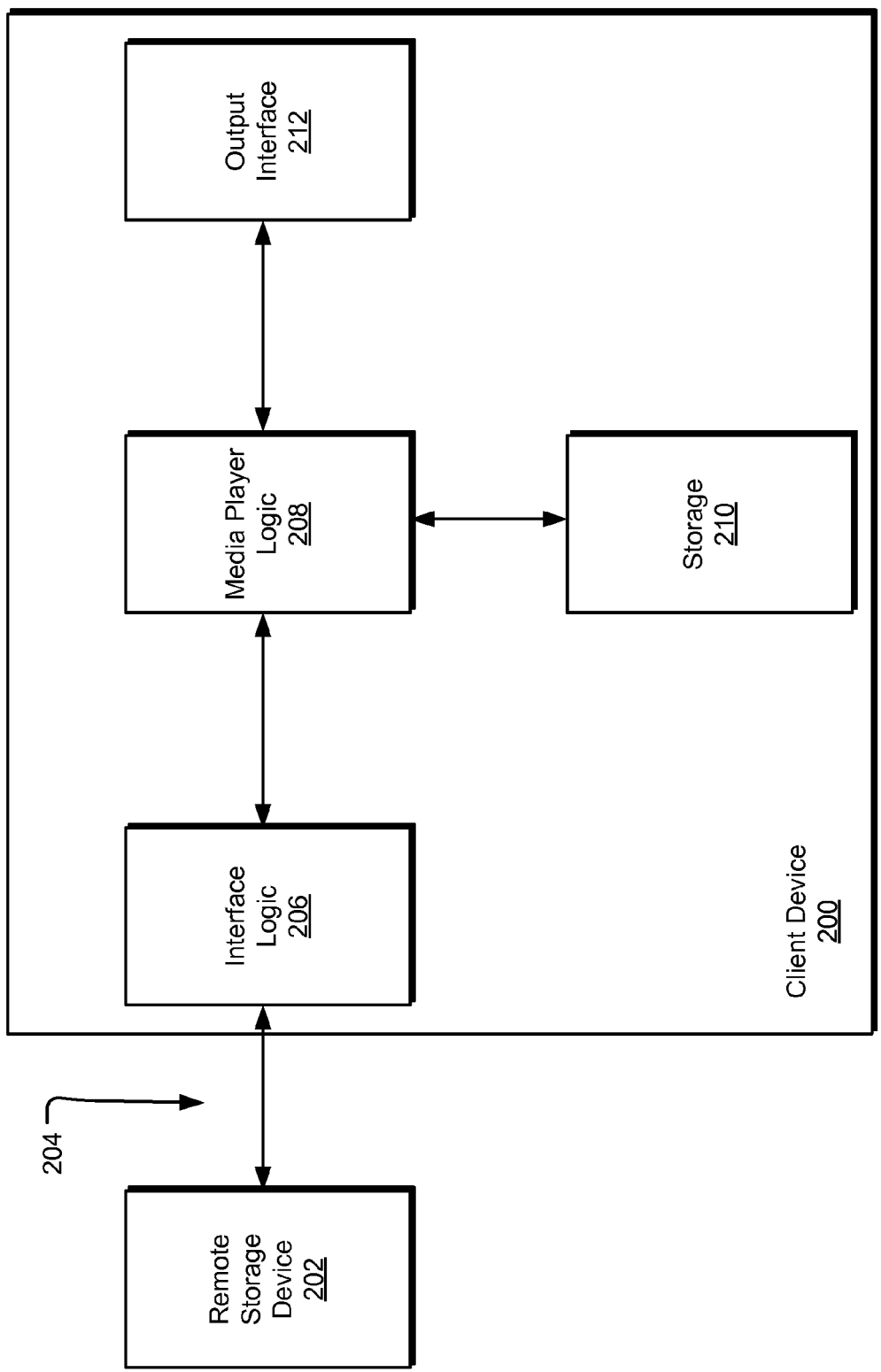
FIG. 2 illustrates an example client device and application software for communicating with a remote storage device.

FIG. 2 illustrates an example client device 200 for communicating with a remote storage device 202. The client device 200 is communicatively coupled to the remote storage device 202 via a communication channel 204, which is typically a wireless communication channel (including WiFi, Bluetooth, IR (infrared), etc.) but which may be wired in some implementations.

The client device 200 includes communications interface logic 206. In one implementation, the communications interface logic 206 includes a proxy server that interfaces between media player logic 208 in the client device 200 and gateway logic in the remote storage device 202. In other implementations the communications interface logic 206 does not include the proxy server but still provides a communications interface between the media player logic 208 and the gateway logic in the remote storage device 202. The presence of the proxy server in the client device 200 isolates the media player logic 208 from the specific implementation of the gateway interaction between the client device 200 and the remote storage device 202. In this manner, various existing media player applications may be employed with the described technology without modification.

As described with regard to FIG. 1, the client device 200 can initiate the loading of media content from the remote storage device 202 by issuing an API call to the remote storage device 202. In response to the API call, the remote storage device 202 initiates transfer of the requested media content and enters a state in which the remote storage device 202 may enter a low power mode upon completion of the transfer. In one implementation, the remote storage device 202 deletes its DHCP gateway address setting and its DNS server address setting and increases the lease time to prevent frequent DHCP negotiations that wake up the remote storage device 202 from its low power mode, which it will enter after completion of the media content transfer.

Concurrently, when the client device 200 receives a sufficient segment of the content media resource from the remote storage device 202 to storage 210 (e.g., flash memory, a solid state drive, etc.) to provide enough buffering for uncorrupted playback, the media player logic 208 plays the media content via an output interface 212, such as a video display, a speaker, etc. DHCP settings may be stored in the storage 210 or in separate storage.

At some future point, the client device 200 will attempt to renew its DHCP lease with the remote storage device 202. Because the DHCP gateway address and DNS server address settings are null on the remote storage device 202, the corresponding address settings are deleted at the client device 200. Accordingly, the operating system of the client device 200 will stop trying to connect to the Internet through the gateway of remote storage device 202. In absence of communications with the client device 200, the remote storage device 202 can enter a low power mode. Therefore, if no other devices are connected to the remote storage device 202, the remote storage device 202 will enter a low power mode when it has completed its transfer of the media content resource (or predetermined segment thereof) to the client device 200.

Gateway logic in the remote storage device provides gateway functionality to devices communicating through the remote storage device 202, allowing such devices to access a network through the gateway logic. DHCP settings for the gateway logic are stored in settings storage in the remote storage device 202. Example DHCP settings include without limitation the DHCP gateway address, the DNS server address, and a lease time.

A power logic and supply module provides power from a battery or other power supply (e.g., an electrical connection)

and manages the power consumption of the remote storage device 202. In one implementation, the power logic and supply module manages multiple power modes, examples of which are shown below:

Streaming mode: content is retrieved from the storage device as it is played on a client device (100% power consumption)

Idle mode: certain electronics are turned off or put in low power mode; system controller set to a lower clock frequency (80% power consumption)

Standby mode: low power idle mode plus the hard drive is transitioned to a spin down state (50% power consumption)

Suspend mode: system image is stored on RAM or Flash memory and then the entire remote storage system is put in lowest power mode; system is only responsive to a new request from a client device-communications interface is still active (10% power consumption)

It should be understood that a "low power mode" is an operational mode of a device that consumes relatively less power than a "high power mode."

The remote storage device 202 also includes a content manager that manages content stored on the remote storage device 202. The content manager, among other functions, (1) manages receipt of content one or more storage interfaces; (2) stores such content in and accesses such content from content storage; and (3) transfers such content from the content storage to other devices. Storage modules may be combined into an integrated module and may include combinations of memory, SSD (solid state drive), magnetic storage discs, and other storage components. The content manager processes the API calls from one or more client devices to manage content transfers, communications, and power management.

Figure 3:
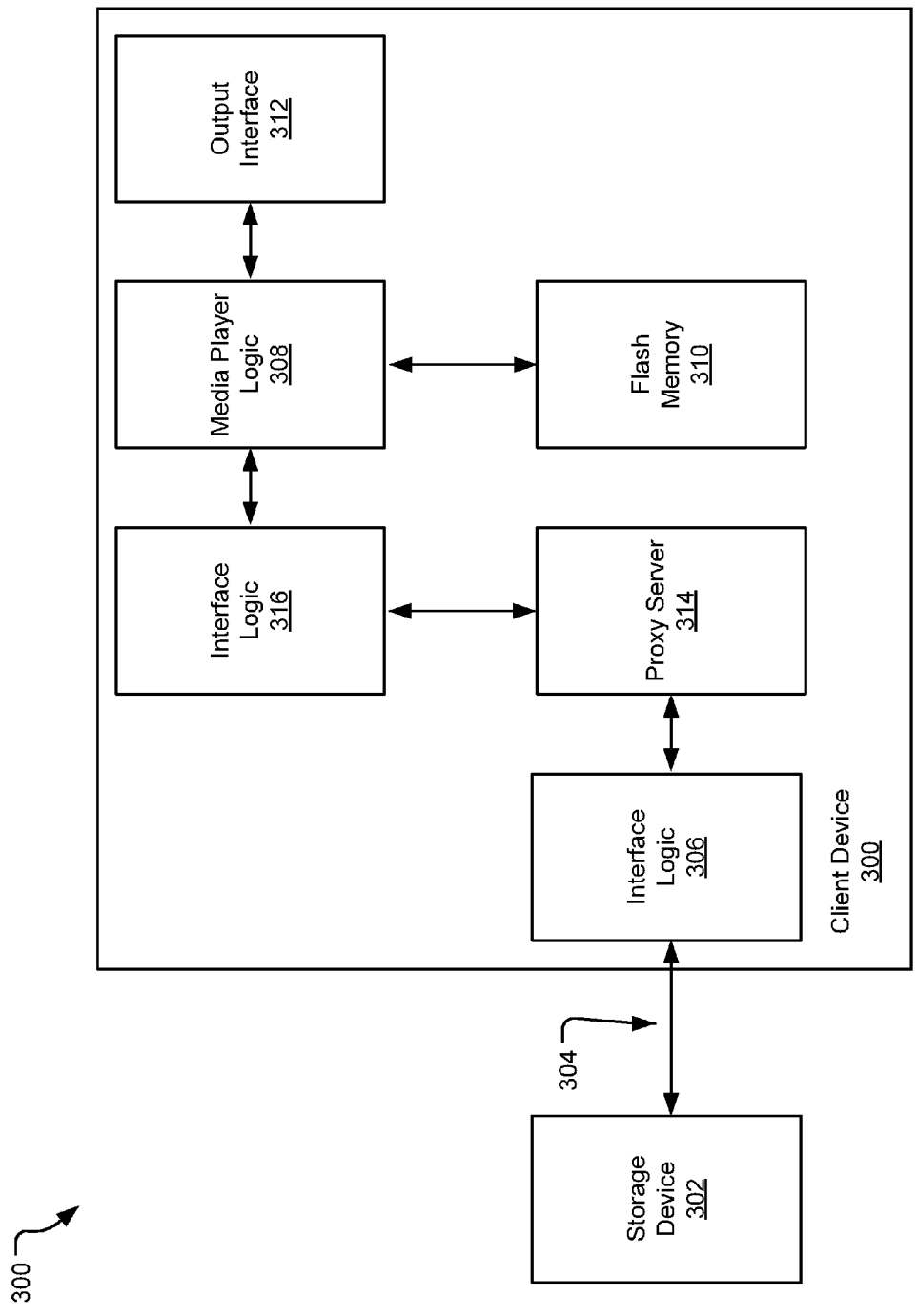
FIG. 3 illustrates another example client device and application software for communicating with a remote storage device.

FIG. 3 illustrates another example client device 300 for communicating with a remote storage device 302. The client device 300 is communicatively coupled to the remote storage device 302 via a communication channel 304, which is typically a wireless communication channel (including WiFi, Bluetooth, IR, etc.) but which may be wired in some implementations.

The client device 300 includes communications interface logic 306. In the illustrated implementation, the communications interface logic 306 is coupled to a proxy server 314 that interfaces between communications interface logic 316 of media player logic 308 in the client device 300 and gateway logic in the remote storage device 302. The media player logic 308 connects through its communications interface logic 316 to the proxy server 314, requesting a service, such as the transfer of media content from the remote storage device 302, and the proxy server 314 evaluates the request as a way to simplify and control their complexity. The presence of the proxy server in the client device 300 isolates the media player logic 308 from the specific implementation of the gateway interaction between the client device 300 and the remote storage device 302. In this manner, various existing media player applications may be employed with the described technology without modification.

As described with regard to FIG. 1, the client device 300 can initiate the loading of media content from the remote storage device 302 by issuing an API call to the remote storage device 302. In response to the API call, the remote storage device 302 initiates transfer of the requested media content and enters a state in which the remote storage device 302 may enter a low power mode upon completion of the transfer. In one implementation, the remote storage device 302 deletes its DHCP gateway address setting and its DNS server address setting and increases the lease time to prevent frequent DHCP negotiations that wake up the remote storage device 302 from its low power mode, which it will enter after completion of the media content transfer.

Concurrently, when the client device 300 receives a sufficient segment of the content media resource from the remote storage device 302 to storage 310 (e.g., flash memory, a solid state drive, etc.) to provide enough buffering for uncorrupted playback, the media player logic 308 plays the media content via an output interface 312, such as a video display, a speaker, etc. DHCP settings may be stored in the storage 310 or in separate storage.

At some future point, the client device 300 will attempt to renew its DHCP lease with the remote storage device 302. Because the DHCP gateway address and DNS server address settings are null on the remote storage device 302, the corresponding address settings are deleted at the client device 300. Accordingly, the operating system of the client device 300 will stop trying to connect to the Internet through the gateway of remote storage device 302. In absence of communications with the client device 300, the remote storage device 302 can enter a low power mode. Therefore, if no other devices are connected to the remote storage device 302, the remote storage device 302 will enter a low power mode when it has completed its transfer of the media content resource (or predetermined segment thereof) to the client device 300.

Figure 4:
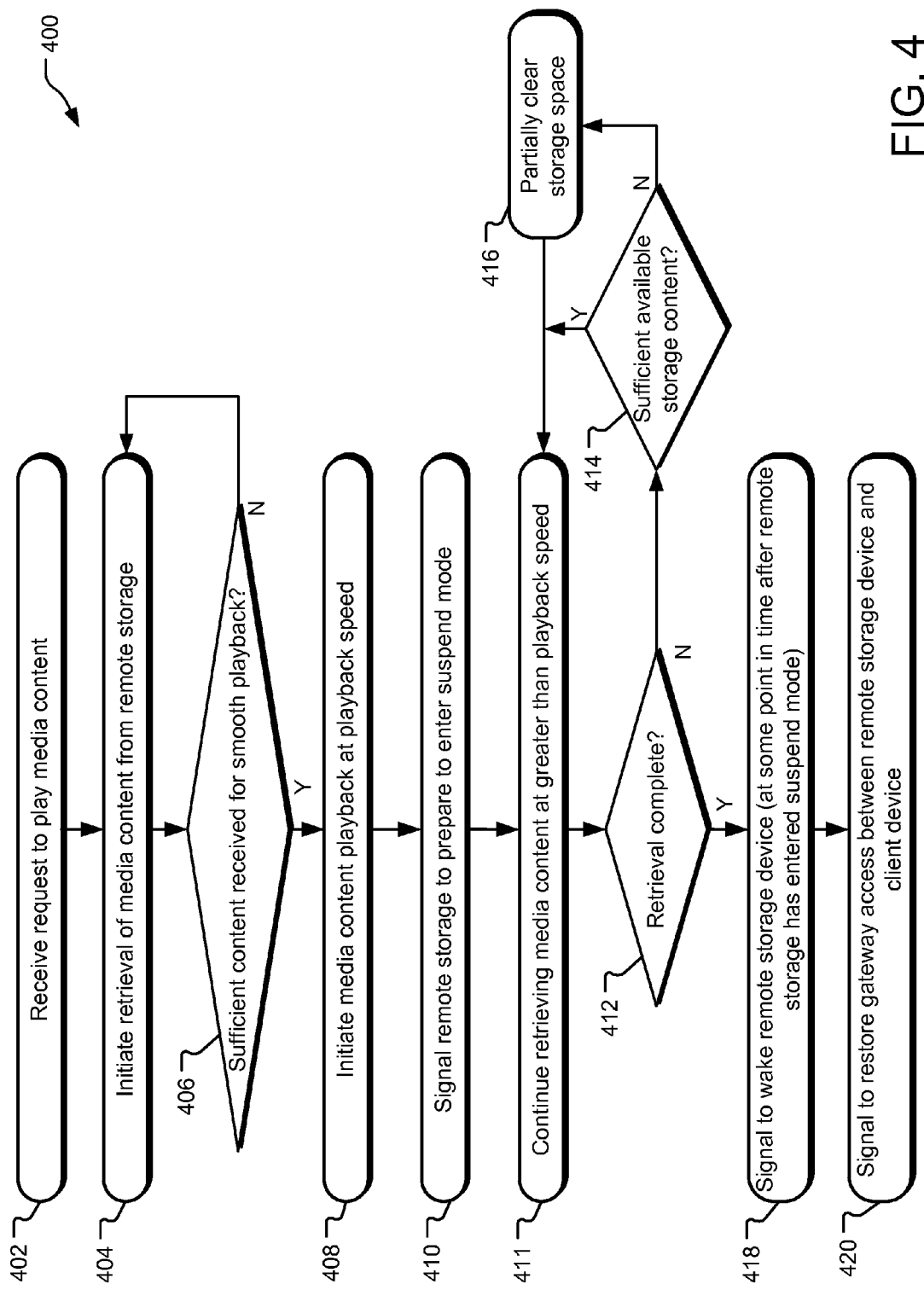
FIG. 4 illustrates example operations for managing loading of media content.

FIG. 4 illustrates example operations 400 for managing loading of media content. A receiving operation 402 receives a request to play media content, such as from a user selecting content for playback via a touch screen interface on the client device. Other selection and receiving implementations may be employed. Responsive to the receiving operation 402, an initiation operation 404 initiates retrieval of the selected media content from the remote storage device. Such retrieval may include communications through a client-resident proxy server or through other interface mechanisms.

After the transfer from the remote storage device has been initiated, a decision operation 406 determines whether sufficient content has been received for smooth playback on the client device. Typically, a media player requests a buffer of a few seconds to ensure jitter-free playback to the user. If sufficient content has been received, a playback operation 408 initiates playback of the content on the client device while continuing to receive additional media content from the remote storage device, which is referred to as "streaming." The rate at which the media content is played on the client device is referred to herein as "playback speed." The transfer of the media content from the remote storage device exceeds the playback speed.

A signaling operation 410 sends an API call to the remote storage device to prepare to enter a low power mode (e.g., "suspend" mode). In one implementation, such preparation involved disabling the gateway of the remote storage device, although in other implementations, other mechanisms may be employed or combined with the gateway disabling operation, including without limitation, setting a timer for entering low power mode to trigger low power mode, setting a transfer monitor to trigger low power mode, etc. Media content transfer continues in a retrieval operation 411.

A decision operation 412 monitors the media content transfer and determines whether the transfer of the media content resource (or a specified segment thereof) is complete. If not, another decision operation 414 determines whether the client device has sufficient available storage capacity for additional media content. If so, media content transfer continues via the retrieval operation 411. Otherwise, a clearing operation 416 makes additional storage capacity available on the client device by partially clearing storage space (e.g., by deleting already-played portions of the media content, by clearing other unneeded data, etc.), before returning to the retrieval operation 411.

If the decision operation 412 determines that the transfer is complete, then the remote storage device goes into a low power mode (e.g., suspend mode). At some point in time thereafter, another signaling operation 418 sends a Wake API call from the client device to the remote storage device to bring the remote storage device into a higher power mode (e.g., in order to retrieve another media content resource, in order to access another network through the gateway, etc.). In one implementation, the Wake API call causes the remote storage device to restore its gateway settings, although other mechanisms may be employed including setting timers, setting conditions, etc. After the gateway is restored in the remote storage device, an access operation 420 sends a Restore API call from the client device to the remote storage device to re-negotiate the DHCP lease so that the client can access the gateway in the remote storage device.

During standard operation, the remote storage device is in one or more high power modes that support standard operations, such as data storage and retrieval, communications with one or more client devices, communications with other networks, etc. As such, the remote storage device can communicate with a client device, such as to load media content to the client device for playback.

When a user selects a media selection for playback on the client device, a Transfer API call is sent from the client device to the remote storage device. The call initiates the transfer of the selected media content resource from the remote storage device to the client device for playback and also causes the remote storage device to disable its gateway. In one implementation, disabling the gateway involves the clearing of the DHCP gateway address and the DNS server address and the increasing of the lease time (e.g., from a typical 5 minutes to 6 hours). For example, the DHCP configuration of a disabled gateway may be set as follows:

| DNS: NULL | (DNS Server Address) |
| Route: NULL | (DHCP Gateway Address) |
| Lease Time: 6 hours | |

When the media content resource (or a predetermined segment thereof) is completely transferred to the client device, and if no other devices are in communicative connection with the remote storage device, the remote storage device enters a low power mode (e.g., lower power consumption than in standard operation). In one implementation, the entire media content resource is transferred before entering low power mode. In another implementation, the issuance of a Transfer API call may be conditioned on an available capacity check at the client device (to ensure there is enough storage space available for the requested media content resource). In yet another implementation, the issuance of the Transfer API call may cause a negotiation between the client device and the remote storage device about the size of segments of the media content resource loaded in each loading phase. For example, the media content may be incrementally loaded to the client device in segments between which the remote storage device may enter a low power state until the next segment is requested.

After the transfer of the media content is completed, the client device can wake up the remote storage device by issuing a Wake API call to the IP address of the remote storage device. This API call may be made in background processing on the client device. Responsive to this API call, the remote storage device transitions to a higher power mode and restores its gateway settings. An example of such settings are shown below:

| DNS: 172.25.0.1 | (DNS Server Address) |
| Route: 172.25.0.1 | (DHCP Gateway Address) |
| Lease Time: 5 minutes | |

Figure 6:
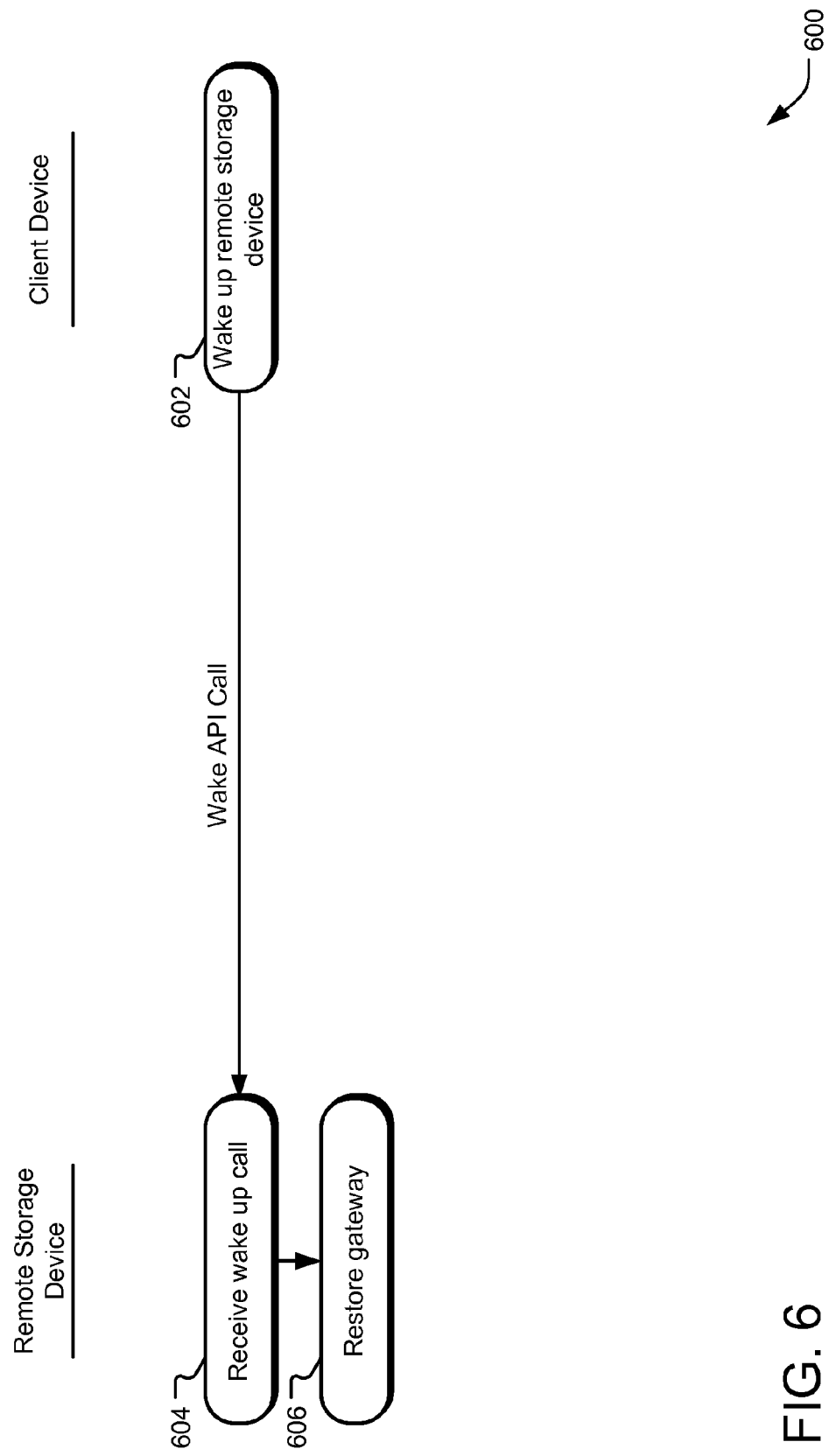
FIG. 6 illustrates example operations between a client device and a remote storage device for restoring network access at the remote storage device.
Figure 7:
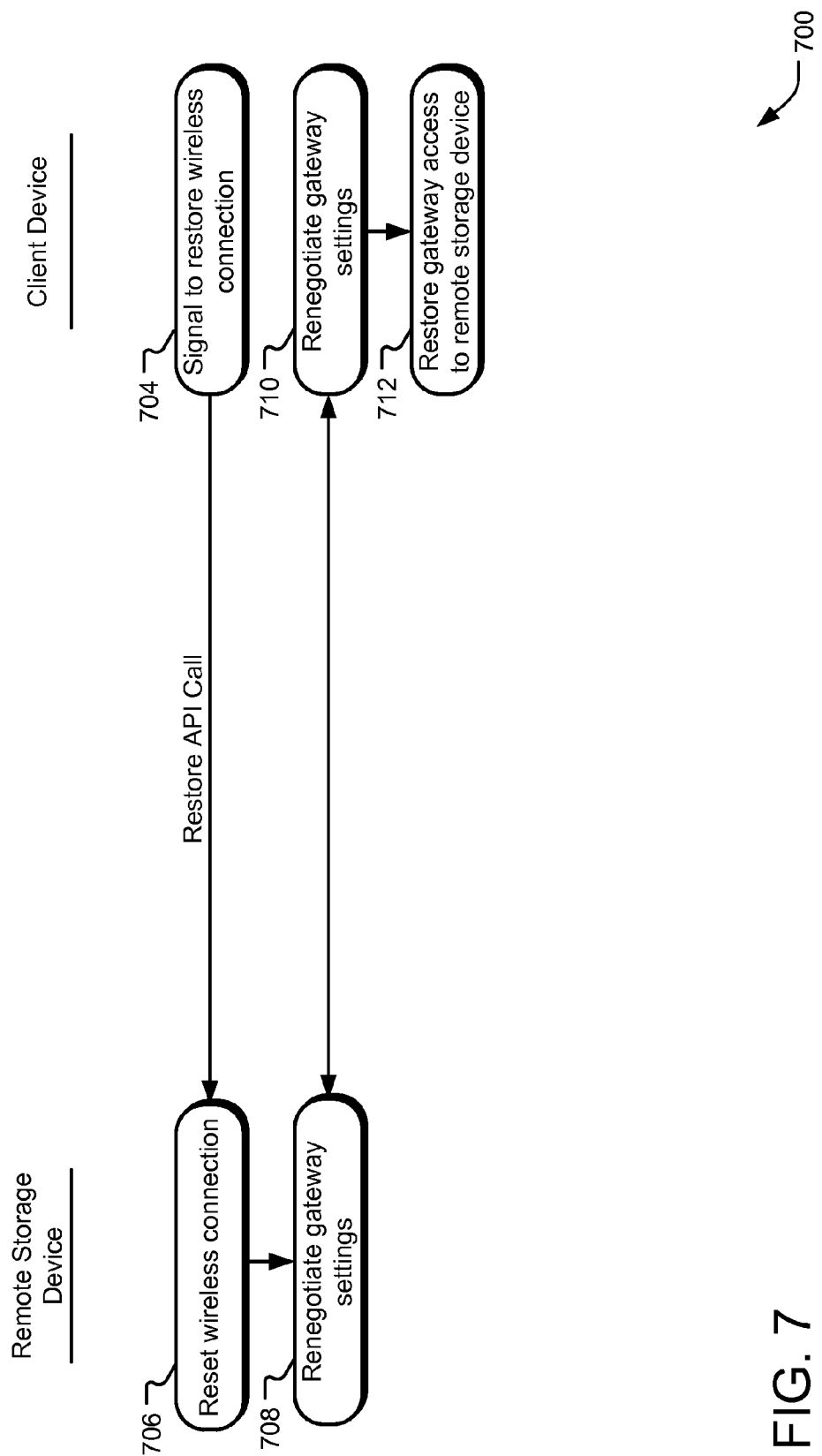
FIG. 7 illustrates example operations between a client device and a remote storage device for restoring network access at the client device.

Although the Wake API call restores the gateway at the remote storage device, the DHCP settings in the client device are not yet restore. Therefore, the client device does not have gateway access to the remote storage device. Accordingly, the client device can issue a Restore API call to the IP address of the remote storage device. This API call may also be made in background processing on the client device. Responsive to this API call, the remote storage device and the client device reset the communications connection (e.g., renewing the DHCP lease for the client device), which sets the client device's DHCP gateway address and DNS server address to match those of the remote storage device. Accordingly, the remote storage device returns to the standard operation with regard to the client device. Discussions of FIGS. 5, 6, and 7 provide more details regarding example implementations of the API calls.

Figure 5:
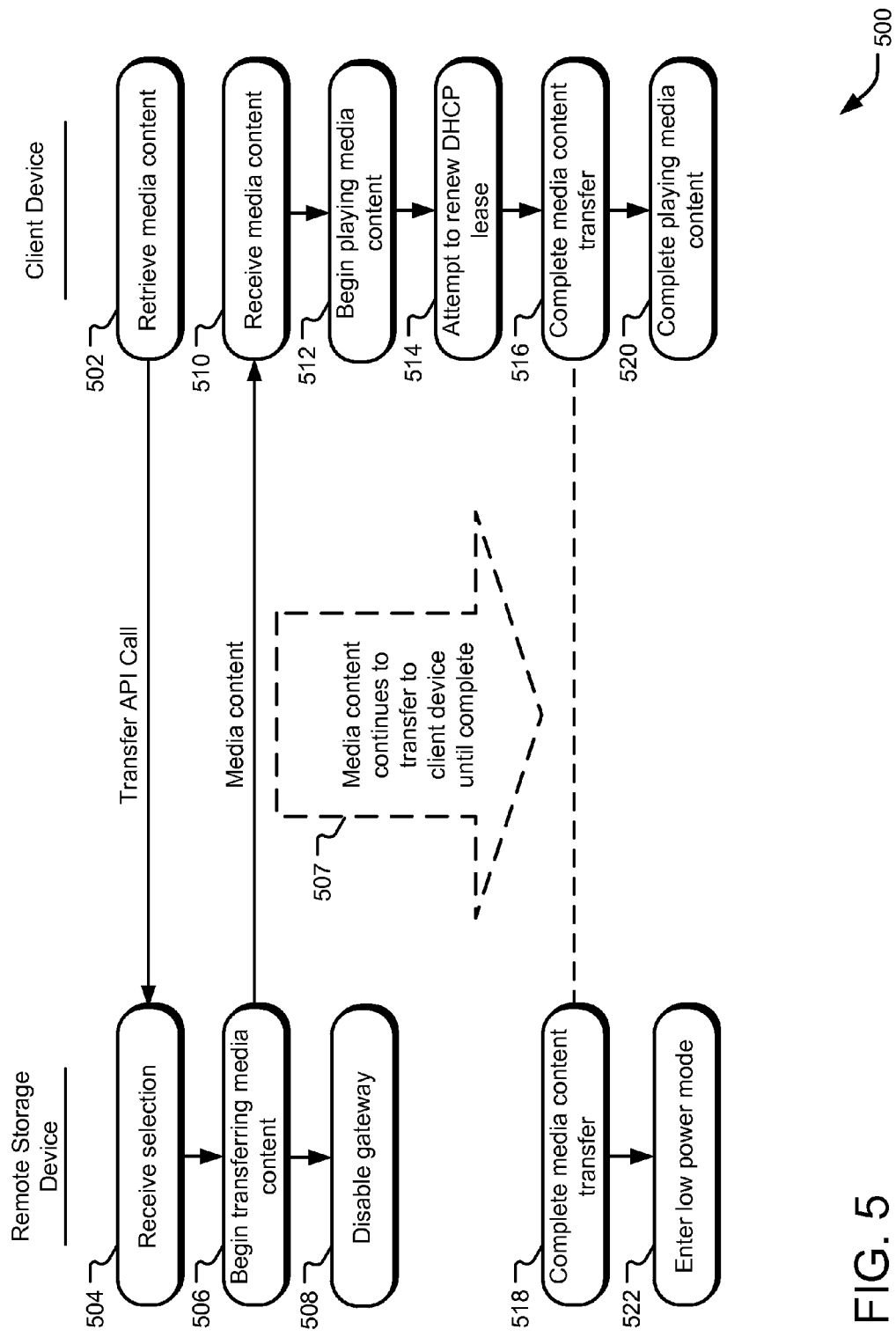
FIG. 5 illustrates example operations between a client device and a remote storage device for managing loading of media content.

FIG. 5 illustrates example operations 500 between a client device and a remote storage device for managing loading of media content. A retrieval operation 502 at the client device receives a selection of a specified media content resource residing on or accessible by the remote storage device and issues a Transfer API call to the remote storage device to instruct the remote storage device to transfer the selected resource and configure itself to enter a low power mode after the transfer is complete. The remote storage device receives the API call and resource selection in a receiving operation 504 and begins transferring the selected media content resource in a transferring operation 506. The transferring operation 506 continues until the transfer of the selected media content resource (or a specified segment thereof) is complete, as illustrated by dashed arrow 507. The remote storage device also disables its gateway in a disabling operation 508 (e.g., setting the DHCP gateway address and DNS server address to NULL and increasing the lease time).

The client device receives the media content from the remote storage device in a receiving operation 510 and begins playing the media content in a playback operation 512. At some point during playback, the client device attempts to renew its DHCP lease (e.g., 5 minutes after its last renewal attempt). Based on the disabled gateway at the remote storage device, the renewal attempt by the client device results in its DHCP settings being modified to reflect the disabled state of the gateway (e.g., setting the DHCP gateway address and DNS server address to NULL and increasing the lease time). Because the lease time is increased to such a long time (e.g., 6 hours), the client device will not frequently wake up the remote storage device after in enters low power mode in an attempt to renew the lease.

The client device and remote storage device complete the media content transfer in transfer operations 516 and 518, respectively. Thereafter, the client device continues to playback the media content from its internal storage in a playback operation 520, and the remote storage device enters a low power mode in a suspend operation 522.

FIG. 6 illustrates example operations 600 between a client device and a remote storage device for restoring network access at the remote storage device. The client device issues a Wake API call to wake up the remote storage device in an API call operation 602. The remote storage device receives the Wake API call in a receiving operation 604, transitioning from a low power mode to a higher power mode, and restores its DHCP gateway settings in a restoring operation 606.

FIG. 7 illustrates example operations 700 between a client device and a remote storage device for restoring network access at the client device. The client device attempts to re-initiate activity with the remote storage device by issuing a Restore API call to the remote storage device in a signaling operation 704. The remote storage device receives the API call in the receiving operation 706, and the two devices renegotiate the DHCP settings in negotiation operations 708 and 710. Based on this renewal of the DHCP lease, the client device restores its gateway access to the remote storage device in a restoring operation 712.

Figure 8:
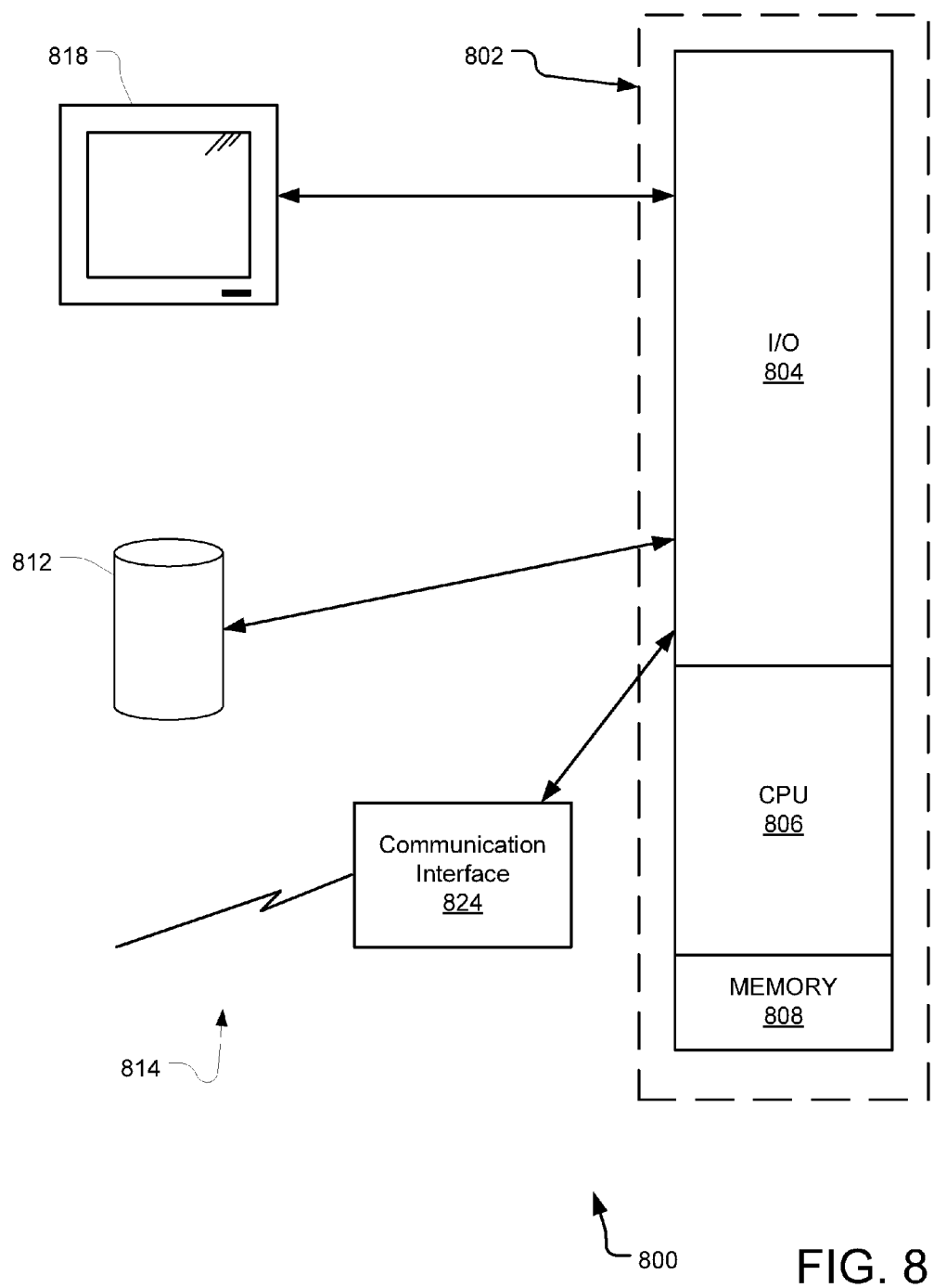
FIG. 8 illustrates an example computing system that may be useful in implementing the presently disclosed technology.

FIG. 8 illustrates an example computing system 800 that may be useful in implementing the presently disclosed technology. The computing system 800 is capable of executing a computer program product embodied in a tangible computer-readable storage medium to execute a computer process. Data and program files may be input to the computing system 800, which reads the files and executes the programs therein using one or more processors. Some of the elements of a computing system 800 are shown in FIG. 8 wherein a processor 802 is shown having an input/output (I/O) section 804, a Central Processing Unit (CPU) 806, and a memory section 808. There may be one or more processors 802, such that the processor 802 of the computing system 800 comprises a single central-processing unit 806, or a plurality of processing units, commonly referred to as a parallel processing environment. The processors may be single core or multi-core processors. The computing system 800 may be a conventional computer, a distributed computer, or any other type of computer. The described technology is optionally implemented in software devices loaded in memory 808, a disc storage unit 812, and/or communicated via a wired or wireless network link 814 on a carrier signal (e.g., Ethernet, 3G wireless, 4G wireless, LTE (Long Term Evolution)) thereby transforming the computing system 800 in FIG. 8 to a special purpose machine for implementing the described operations.

The I/O section 804 may be connected to one or more user-interface devices (e.g., a keyboard, a touch-screen display unit 818, etc.) or a disc storage unit 812. Computer program products containing mechanisms to effectuate the systems and methods in accordance with the described technology may reside in the memory section 804 or on the storage unit 812 of such a system 800.

A communication interface 824 is capable of connecting the computer system 800 to a network via the network link 814, through which the computer system can receive instructions and data embodied in a carrier wave. When used in a local area networking (LAN) environment, the computing system 800 is connected (by wired connection or wirelessly) to a local network through the communication interface 824, which is one type of communications device. When used in a wide-area-networking (WAN) environment, the computing system 800 typically includes a modem, a network adapter, or any other type of communications device for establishing communications over the wide area network. In a networked environment, program modules depicted relative to the computing system 800 or portions thereof, may be stored in a remote memory storage device. It is appreciated that the network connections shown are examples of communications devices for and other means of establishing a communications link between the computers may be used.

In an example implementation, interface logic, media player logic, proxy server logic, gateway functionality, media content transfer modules, power management modules, API calling modules, and other modules and services may be embodied by instructions stored in memory 808 and/or the storage unit 812 and executed by the processor 802. Further, local computing systems, remote data sources and/or services, and other associated logic represent firmware, hardware, and/or software configured to manage gateway access, communications, and power management. Such services may be implemented using a general purpose computer and specialized software (such as a server executing service software), a special purpose computing system and specialized software (such as a mobile device or network appliance executing service software), or other computing configurations. In addition, program data, such as media content, DHCP settings, data read from and written to a storage device or a playback device, and other data may be stored in the memory 808 and/or the storage unit 812 and executed by the processor 802.

Figure 9:
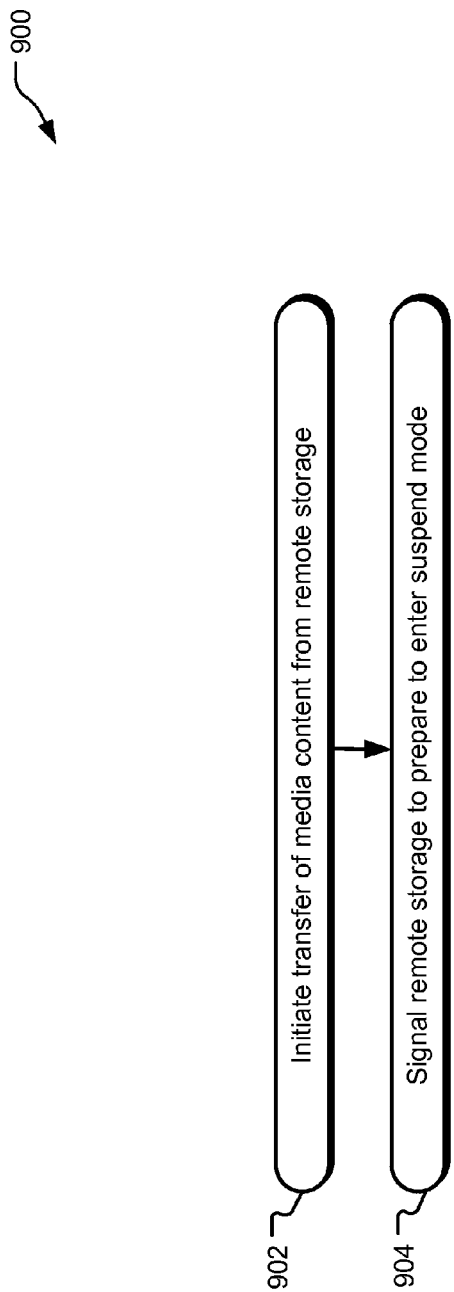
FIG. 9 illustrates example operations for managing loading of media content.

FIG. 9 illustrates example operations 900 for managing loading of media content. An initiation operation 902 initiates retrieval of the selected media content from the remote storage device. Such retrieval may include communications through a client-resident proxy server or through other interface mechanisms.

A signaling operation 904 sends an API call to the remote storage device to prepare to enter a low power mode (e.g., "suspend" mode). In one implementation, such preparation involved disabling the gateway of the remote storage device, although in other implementations, other mechanisms may be employed or combined with the gateway disabling operation, including without limitation, setting a timer for entering low power mode to trigger low power mode, setting a transfer monitor to trigger low power mode, etc.

Figure 10:
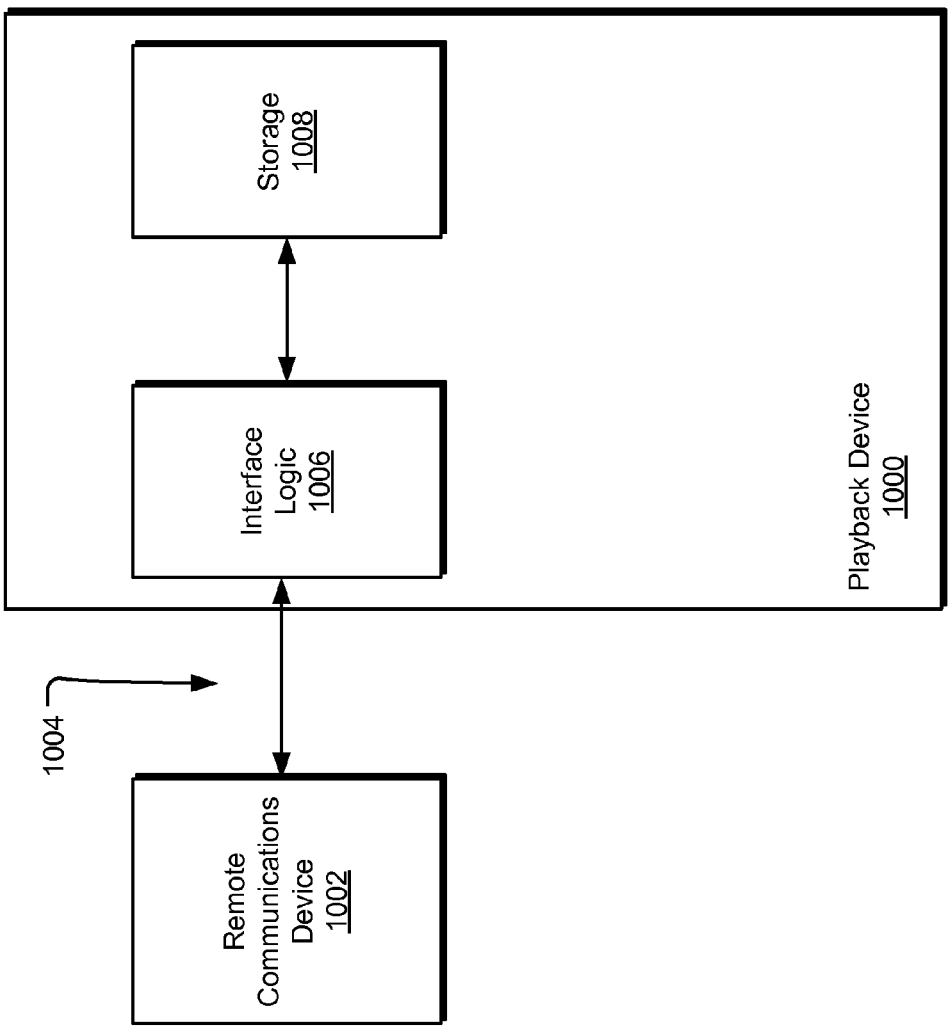
FIG. 10 illustrates an example playback device for communicating with a remote communications device.

FIG. 10 illustrates an example playback device 1000 for communicating with a remote communications device 1002. The playback device 1000 is communicatively coupled to the remote communications device 1002 via a communication channel 1004, which is typically a wireless communication channel (including WiFi, Bluetooth, IR, etc.) but which may be wired in some implementations.

The playback device 1000 includes communications interface logic 1006. In one implementation, the communications interface logic 1006 includes a proxy server that interfaces between media player logic in the playback device 1000 and gateway logic in the remote communications device 1002. In other implementations, the communications interface logic 1006 does not include the proxy server but still provides a communications interface between the media player logic and the gateway logic in the remote communications device 1002. The presence of the proxy server in the playback device 1000 isolates the media player logic from the specific implementation of the gateway interaction between the playback device 1000 and the remote communications device 1002. In this manner, various existing media player applications may be employed with the described technology without modification.

As described with regard to FIG. 1, the playback device 1000 can initiate the loading of media content from the remote communications device 1002 by issuing an API call to the remote communications device 1002. In response to the API call, the remote communications device 1002 initiates transfer of the requested media content and enters a state in which the remote communications device 1002 may enter a low power mode upon completion of the transfer. In one implementation, the remote communications device 1002 deletes its DHCP gateway address setting and its DNS server address setting and increases the lease time to prevent frequent DHCP negotiations that wake up the remote communications device 1002 from its low power mode, which it will enter after completion of the media content transfer.

Concurrently, when the playback device 1000 receives a sufficient segment of the content media resource from the remote communications device 1002 to tangible storage 1008 (e.g., flash memory, a solid state drive, etc.) to provide enough buffering for uncorrupted playback, the media player logic plays the media content via an output interface, such as a video display, a speaker, etc. DHCP settings may be stored in the tangible storage 1008 or in separate storage.

At some future point, the playback device 1000 will attempt to renew its DHCP lease with the remote communications device 1002. Because the DHCP gateway address and DNS server address settings are null on the remote communications device 1002, the corresponding address settings are deleted at the playback device 1000. Accordingly, the operating system of the playback device 1000 will stop trying to connect to the Internet through the gateway of remote communications device 1002. In absence of communications with the playback device 1000, the remote communications device 1002 can enter a low power mode. Therefore, if no other devices are connected to the remote communications device 1002, the remote communications device 1002 will enter a low power mode when it has completed its transfer of the media content resource (or predetermined segment thereof) to the playback device 1000.

Gateway logic in the remote communications device 1002 provides gateway functionality to devices communicating through the remote communications device 1002, allowing such devices to access a network through the gateway logic. DHCP settings for the gateway logic are stored in settings storage in the remote communications device 1002. Example DHCP settings include without limitation the DHCP gateway address, the DNS server address, and a lease time. A power logic and supply module provides power from a battery or other power supply (e.g., an electrical connection) and manages the power consumption of the remote communications device 1002.

Figure 11:
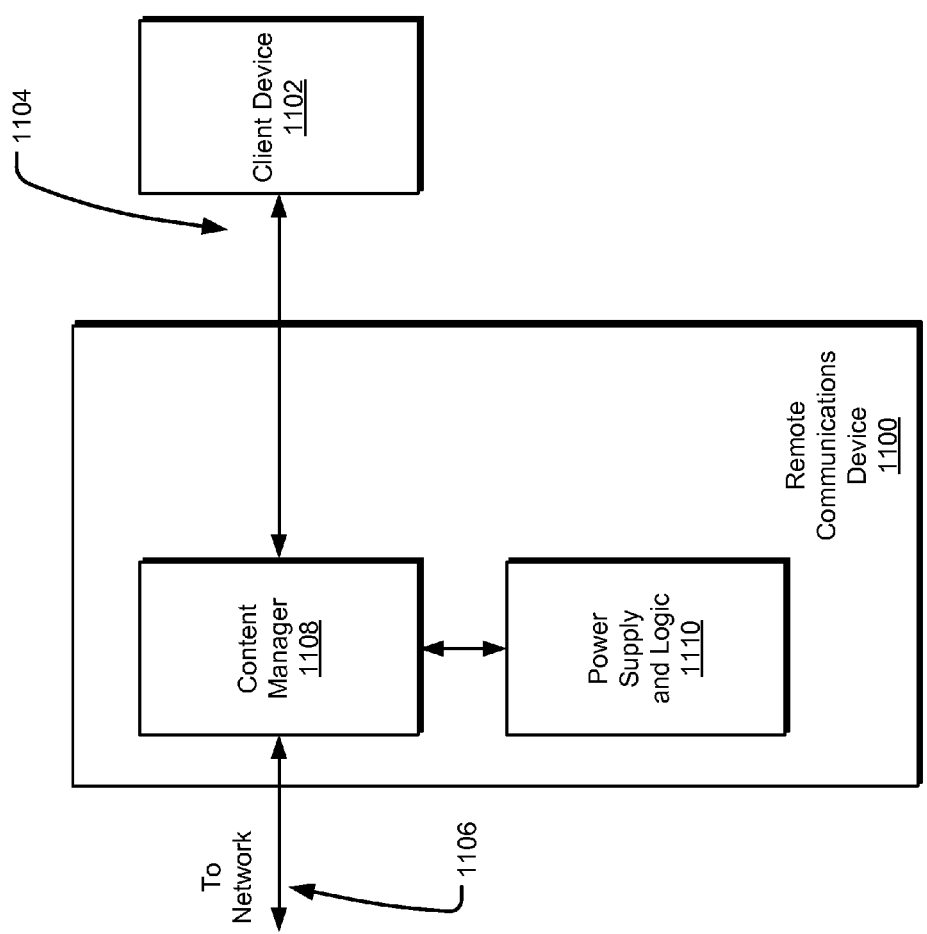
FIG. 11 illustrates an example remote communications device for communicating with a client device.

FIG. 11 illustrates an example remote communications device 1100 for communicating with a client device 1102. The remote storage device 1100 is communicatively coupled to the client device 1102 via a wireless or wired communications link 1104 and optionally to another network via a wireless or wired communications link 1106. Gateway logic in the remote communications device 1100 provides gateway functionality to devices communicating through the remote communications device 1100, allowing such devices to access the network through the gateway. DHCP settings for the gateway logic are stored in DHCP settings storage. Example DHCP settings include without limitation the DHCP gateway address, the DNS server address, and a lease time.

A power logic and supply module 1110 provides power from a battery or other power supply (e.g., an electrical connection) and manages the power consumption of the remote communications device 1100. In one implementation, the power logic and supply module 1110 manages multiple power modes, examples of which are shown below:

- Streaming mode: content is retrieved from the storage device as it is played on a client device (100% power consumption)
- Idle mode: certain electronics are turned off or put in low power mode; system controller set to a lower clock frequency (80% power consumption)
- Standby mode: low power idle mode plus the hard drive is transitioned to a spin down state (50% power consumption)
- Suspend mode: system image is stored on RAM or Flash memory and then the entire remote storage system is put in lowest power mode; system is only responsive to a new request from a client device-communications interface is still active (10% power consumption)

It should be understood that a "low power mode" is an operational mode of a device that consumes relatively less power than a "high power mode."

The remote communications device 1100 also includes a content manager 1108 that manages content stored on the remote communications device 1100. The content manager 1108, among other functions, (1) manages receipt of content; (2) stores such content in and accesses such content from content storage; and (3) transfers such content from the content storage to other devices. Storage modules may be combined into an integrated module and may include combinations of memory, SSD, magnetic storage discs, and other storage components. The content manager 1108 processes the API calls from one or more client devices to manage content transfers, communications, and power management.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or a specific order is inherently necessitated by the claim language. Furthermore, one of more portions of the various processes disclosed above with respect to FIG. 8 may be implemented by software, hardware, firmware or combination thereof.

It should be understood that described and recited operations may be performed in any order, unless explicitly claimed otherwise or a specific order is inherently necessitated by the claim language. The data storage and/or memory may be embodied by various types of storage, such as hard disc media, optical media, solid-state drive technology, ROM (read only memory), RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   transferring media content from a first device to a second device while the first device is operating in a standard power mode; and
   signaling the first device during the transferring operation to prepare the first device to enter a relatively lower power mode after the transfer is complete.

2. The method of claim 1 wherein the transferring is accomplished at a rate greater than a jitterless playback rate of the media content on the second device.

3. The method of claim 1 further comprising:
suspending communications between the first device and the second device after the transfer is complete.

4. The method of claim 3 further comprising:
sending a lease renewal request to the second device; and
configuring DHCP settings in the first device to conform to a disabled DHCP instantiation received from the second device.

5. The method of claim 1 further comprising:
signaling the first device to exit the relatively lower power mode after the transferring is complete; and
signaling the first device to restore gateway access with the second device, after signaling the first device to exit the relatively lower power mode.

6. The method of claim 5 wherein the operation of signaling a first device to restore gateway access with the second device comprises:
sending a lease renewal request to the second device; and
setting DHCP settings in the first device to an enabled DHCP configuration received from the second device.

7. The method of claim 1 wherein the first device includes a battery powered storage device and the second device includes a mobile client device capable of playing the media content.

8. A playback device comprising:
tangible storage configured to receive transfer of media content from a remote communications device to the playback device while the remote communications device is operating in a high power mode; and
interface logic coupled to the tangible storage and configured to signal the remote communications device during the transfer to prepare the remote communications device to enter a relatively lower power mode after the transfer is complete.

9. The playback device of claim 8 wherein the transfer is accomplished at a rate greater than a jitterless playback rate of the media content on the playback device.

10. The playback device of claim 8 wherein the interface logic is further configured to suspend communications between the remote communications device and the playback device after the transfer is complete.

11. The playback device of claim 8 wherein the interface logic is further configured to signal the remote communications device to exit the relatively lower power mode after the transfer is complete.

12. The playback device of claim 11 wherein the interface logic is further configured to signal the storage device to restore gateway access with the playback device, after the playback device has signaled the remote communications device to exit the relatively lower power mode.

13. One or more computer-readable tangible storage media encoding processor-executable instructions for executing on an electronic device a processor-executable process, the process comprising:
receiving transfer of media content from a storage device to a playback device while the storage device is operating in a high power mode; and
signaling the storage device during the transfer to prepare the storage device to enter a relatively lower power mode after the transfer is complete.

14. The one or more computer-readable tangible storage media of claim 13 wherein the transfer is accomplished at a rate greater than a jitterless playback rate of the media content on the playback device.

15. The one or more computer-readable tangible storage media of claim 13 wherein the process comprises:
suspending communications between the storage device and the playback device after the transfer is complete.

16. The one or more computer-readable tangible storage media of claim 13 wherein the process comprises:
signaling the storage device to exit the relatively lower power mode after the transfer is complete.

17. The one or more computer-readable tangible storage media of claim 16 wherein the process comprises:
signaling the storage device to restore gateway access with the playback device, after the operation of signaling the storage device to exit the relatively lower power mode.

18. A remote communications device comprising:
a content manager configured to transfer of media content from the remote communications device to a playback device while the remote communications device is operating in a first power mode;
power logic coupled to the content manager and configured to prepare the remote communications device to enter a second power mode after the transfer is complete, the preparation being responsive to receipt of a signal from the playback device during the transfer is complete.

19. The remote communications device of claim 18 wherein the transfer is accomplished at a rate greater than a jitterless playback rate of the media content on the playback device.

20. The remote communications device of claim 19 wherein the power logic is further configured to exit the second power mode and restore gateway access with the playback device, responsive to receipt of one or more signals from the playback device.

* * * * *